United States Patent [19]

Carella et al.

[11] 4,247,071
[45] Jan. 27, 1981

[54] SEAT HEIGHT ADJUSTER

[75] Inventors: Richard F. Carella, Mt. Clemens, Mich.; Thomas W. Perry, South Bend, Ind.

[73] Assignee: General Motors Corporation, Detroit, Mich.

[21] Appl. No.: 30,126

[22] Filed: Apr. 16, 1979

Related U.S. Application Data

[63] Continuation of Ser. No. 903,193, May 5, 1978, abandoned.

[51] Int. Cl.³ .............................................. F16M 13/00
[52] U.S. Cl. .................................................... 248/396
[58] Field of Search ................. 248/371, 394, 396, 397

[56] References Cited

U.S. PATENT DOCUMENTS

| | | | |
|---|---|---|---|
| 2,298,351 | 10/1942 | DeRose | 248/394 |
| 3,552,707 | 1/1971 | Tanaka | 248/396 X |
| 3,669,398 | 6/1972 | Robinson | 248/394 X |
| 3,692,271 | 9/1972 | Homier | 248/396 X |

FOREIGN PATENT DOCUMENTS

| | | | |
|---|---|---|---|
| 2409579 | 9/1975 | Fed. Rep. of Germany | 248/396 |
| 2616802 | 12/1976 | Fed. Rep. of Germany | 248/396 |
| 649595 | 11/1972 | Italy | 248/296 |
| 528081 | 10/1940 | United Kingdom | 248/394 |

Primary Examiner—William H. Schultz
Attorney, Agent, or Firm—Herbert Furman

[57] ABSTRACT

A height adjustment mechanism for a vehicle seat cushion which permits selective vertical adjustments of the forward and the rearward portions of the seat. The seat support includes fore and aft brackets which extend downward from the seat cushion and are attached in a pivotal manner at their lower ends to outboard ends of link arms. The link arms extend in the fore and aft direction from a central location where they are pivoted about a common axis and supported by a stationary support or bracket means. Interaction between pins carried by the arms and vertically toothed sector means formed in the stationary bracket positively locates the arms in a preselected vertical position. The arms are movable within a range determined by the extent which the pins are free to move in the toothed sector or slotted apertures. A centrally located actuating rod extends coaxially with respect to the torque rods and includes a cam portion near its end which produces selective unlatching movement of the pins away from the toothed sector of the elongated slots. Thereafter, the link arms can be rotated to change the height orientation of either the forward or the rearward edge of the seat cushion.

6 Claims, 5 Drawing Figures

SEAT HEIGHT ADJUSTER

This is a continuation of application Ser. No. 903,193, now abandoned, filed May 5, 1978.

This invention relates to seat height adjusting mechanisms and particularly to a simple and compact seat height mechanism with a central support and actuating assembly to selectively free the forward or rearward edge of the seat cushion for height adjustment by pivotal movement of supporting link arms.

A number of seat height adjusting mechanisms are known, and a very brief discussion of the more pertinent references follows. Vertical height adjustment mechanisms commonly utilize arms to support the seat, the arms being mounted in a manner so that the outboard end of the arms are attached to the vehicle and a mid portion is attached to the seat cushion. The inboard ends of the arms are interacted with latching means to permit a change in the angular position of the link arms and the vertical position of the outboards. The following patents represent this type of arrangement: U.S. Pat. Nos. 3,692,271 and 3,460,793.

There are also prior devices which disclose the seat cushion attached to the outboard ends of the adjusting or link arms and the mid portion attached to a floor support means. The inboard ends of the arms are engaged by latch means so as to fix the angular orientation of the link arms and the preselected vertical position of the outboard ends. The following patents represent this type of arrangement: U.S. Pat. Nos. 3,165,351; 2,609,029; 2,795,267.

A third group of prior art devices attaches the outboard ends of support arms to the latch mechanisms and provides a stationary support for the inboard ends. The mid portion is connected to the seat. U.S. Pat. No. 3,147,945 is representative of this type of prior art arrangement.

The aforementioned arrangements require unnecessarily complex structure when compared to the subject adjustment mechanism which is disclosed in the drawings and discussed in detail hereinafter. Briefly, the subject height adjusting mechanism utilizes swingable support arms which are attached at outboard ends to depending brackets from the seat cushion mounting member or seat track. The arms are swingable about a common central axis extending through inboard ends of the link arms. Specifically, concentric torque tubes are attached to either of the two link arms to provide an upward spring bias on the seat cushion to make seat height adjustment smoother and simpler. At about the mid portion of the support arms, a movable pin means engages one of several vertically stacked tooth forming formations in a sector shaped or slotted opening. The toothed portions are formed in the stationary seat support bracket. A cam member on a shaft extends concentrically with the aforementioned torque rods to control movement of the pins with respect to the tooth indentations of the slotted sector opening. When it is desirable to move the forward or the rearward edge of the seat cushion in a vertical direction, the cam is actuated to disengage one of the pins from a toothed portion which permits angular adjustment of the link arm and thereby vertical adjustment of one of the seat cushion edges.

The subject adjustment and support arrangement has several advantages over the aforedescribed patented devices. A central support pivot and combination actuating member is provided which extends through a centrally located and stationary mounting bracket. The support arms thus pivot about an axis through the inboard ends, which is a common axis, while the opposite outboard ends of the link arms are pivotally attached to depending brackets from the seat cushion mounting member. By this arrangement, a maximum height adjustment is possible, given a specific angular movement of the link arm. The arrangement is very compact, since the overall link dimension of the adjusting mechanism is slightly less than the sum of both link arms.

Likewise, compactness and simplicity are enhanced by providing an intermediate pin carrying adjustment or latching member on each arm located between the outboard and inboard ends. Latching and unlatching movement of the pin carrying member is by the central actuating member which has a cam plate as a part thereof. The elongated slotted opening or toothed sector in the stationary support bracket is located inboard from the seat supporting outboard ends of the link arms, and thus vertical adjustment of the seat edge is always greater than the movement of the latching pin in the elongated opening.

Further advantages and other features of the present adjusting mechanism will be more readily apparent after a reading of the following detailed description, reference being had to the accompanying drawing in which a preferred embodiment is illustrated in several operative positions. In the drawings.

Figure 1:
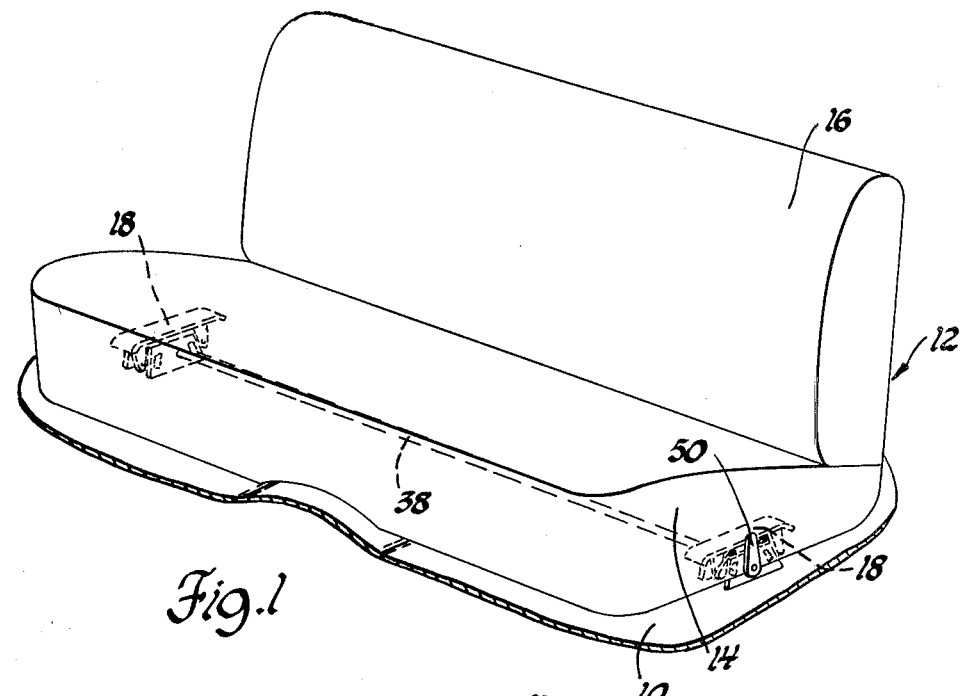
FIG. 1 is a fragmentary and perspective view of the vehicle compartment with a floor in a portion of the seat assembly shown.
Figure 4:
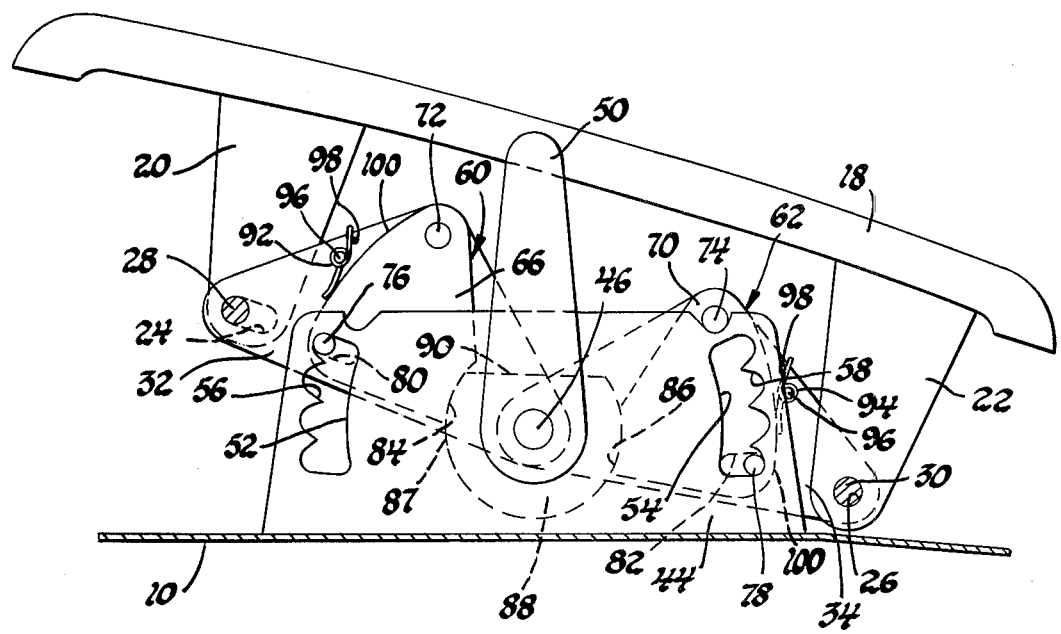
FIG. 4 is a view similar to FIG. 2 but showing a position of the adjusting mechanism in which the forward edge of the seat has been raised to a maximum position.
Figure 5:
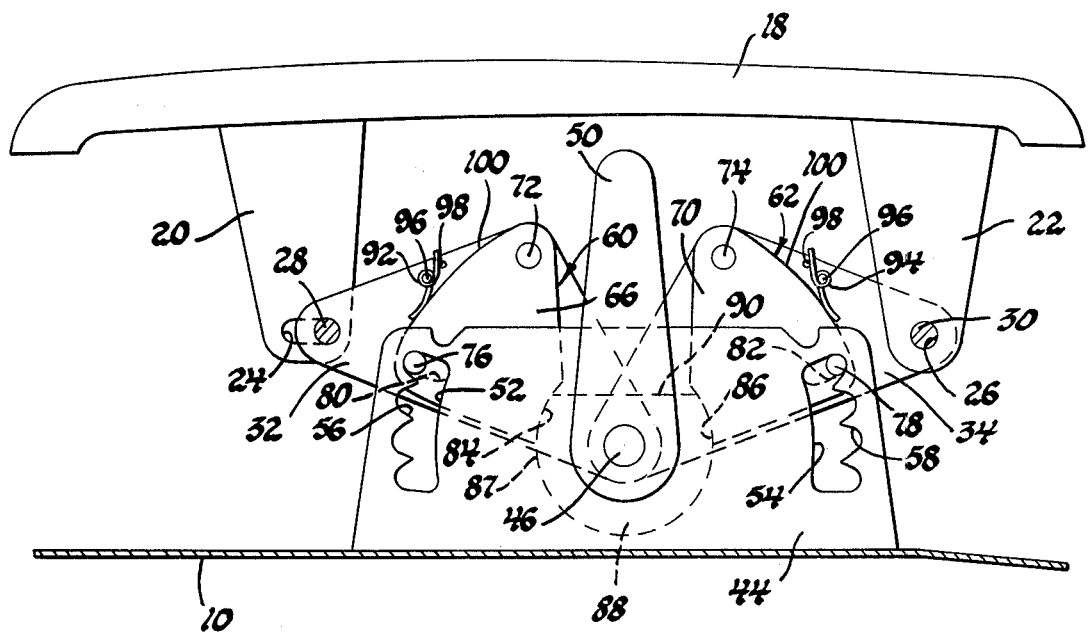
FIG. 5 is a view similar to FIG. 2 wherein the rearward edge of the seat cushion has been raised to its maximum position from the position shown in FIGS. 2 and 4.

In FIG. 1 of the drawings, a portion of a vehicle floor is shown and supported thereabove is a seat assembly 12 which includes a generally horizontally oriented seat cushion portion 14 and a generally vertically oriented seat back portion 16 attached thereto. The seat cushion assembly 14 includes a mounting or base member 18 located at either end and which is better shown in FIGS. 2, 4 and 5. Depending from member 18 are fore and aft located brackets 20, 22 each having openings 24, 26 in their lower ends. The opening 24 is a horizontally slotted opening. The lower ends of members 20, 22 are pivotally fastened through the openings 24, 26 by rivet like connectors 28, 30 to the outboard or extreme fore and aft ends of a pair of support or link arms 32, 34. The arms 32, 34 extend in the general fore and aft direction with respect to the vehicle and are connected to concentric tubular torque members 36, 38 at their inboard ends. The tubular members 36, 38 extend laterally across the vehicle underneath the seat cushion as shown in FIG. 1. The outermost tubular member 38 extends through opening 40 in one of the two stationary support members 42. Member 42 is attached to the vehicle floor.

The outermost vertically extending support member 44 is spaced slightly from member 42.

Extending concentrically through the inner diameter of the tubular member 36 is an actuator rod 46. Rod 46 is supported by the tubes 36, 38 and the laterally outward end extends through an opening 48 in the outer stationary support member 44. An upwardly directed actuating lever 50 is attached to the outward end of the actuator rod 46 and can be pivoted forwardly to the position labeled "A" in FIG. 2 from a position "N" shown in FIG. 2. Position N represents a neutral or nonadjustment position of lever 50. Also, the lever 50 may be pivoted rearwardly to the position B shown in FIG. 2 whenever the rearward edge of the seat cushion is to be adjusted vertically. The parallel and stationary support brackets 42, 44 each include forwardly and rearwardly located vertical slots or sector-like apertures 52, 54. The slotted apertures 52 are located forwardly of actuating rod 46 and have a plurality of vertically spaced toothed grooves 56 displayed along the forward edge of the opening to form a toothed sector opening. Likewise, the rearwardly slotted apertures 54 have a plurality of toothed grooves 58 formed in the rearward edge of the opening 54. The toothed grooves 56, 58 define toothed sector openings and in cooperation with a pin carrying latching member are determinative of the height establishing mechanism of the subject actuator.

Figure 2:
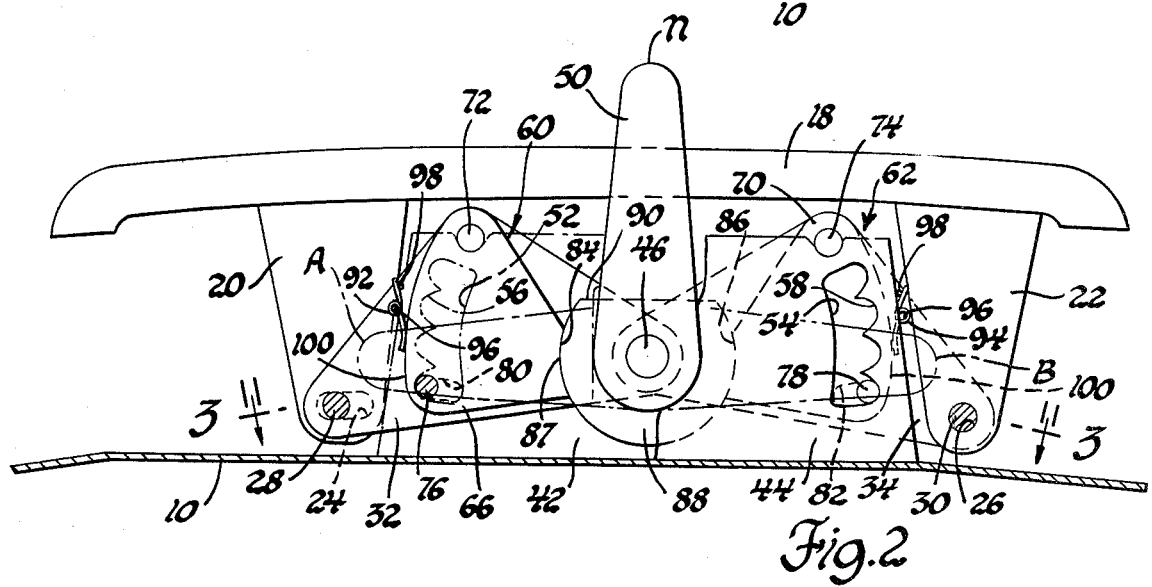
FIG. 2 is a fragmentary and enlarged end view of the adjusting mechanism partially in section and broken away to reveal various parts thereof.
Figure 3:
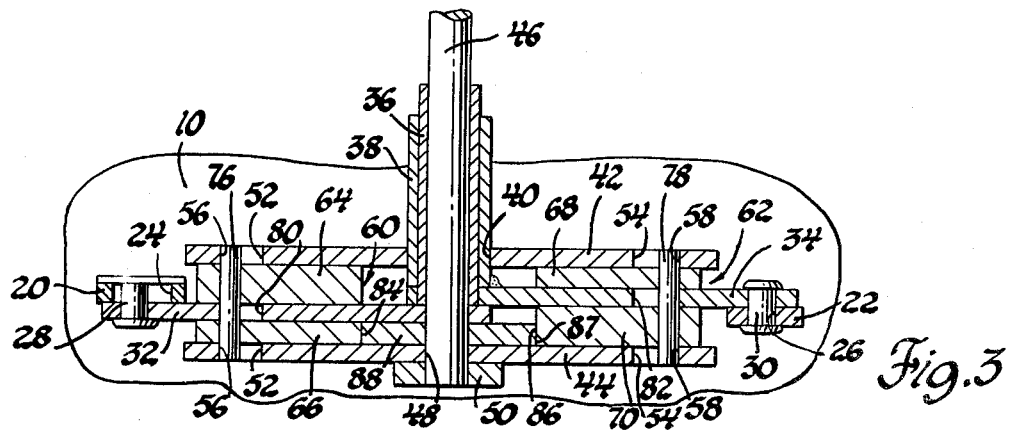
FIG. 3 is a section view of the adjusting mechanism shown in FIG. 2 and taken along the section line 3—3 in FIG. 2 looking in the direction of the arrows.

A pair of latching means 60 and 62 are shown in FIGS. 2 and 3 and include two plate members 64, 66 and 68, 70. Member 64, 66 extend on either side of the link arm 32 and plate member 68, 70 extend on either side of the arm 34. All plate members 64, 66, 68 and 70 are between the stationary support brackets 42, 44. As can be best seen in FIG. 2, the latching means 60, 62 are attached to the link arms 32, 34 by means of rivet-like fasteners 72, 74 which permit individual plate members to pivot thereabout. Pairs of plate members 64, 66 and 68, 70 are forced to move simultaneously about their respective fasteners by pins 76, 78 which extend through the members 64, 66 and through members 68, 70. The pin 76 also extends through the sector openings 52 in members 42 and 44 and through a slotted opening 80 in the link arm 32. Likewise, pin 78 extends through the sector opening 54 and members 42, 44 and a slotted opening 82 in the link arm 34. Both pins 76, 78 extend through plates 64, 66, 68 and 70 in a pressed fit relationship.

As previously mentioned, the latching means 60, 62 are capable of pivotal movement about fasteners 72, 74. Normally, the latching means are held in the latched position shown in FIG. 2 by the interaction between inboard surfaces 84, 86 on plate members 66 and 70 and a generally circular portion 87 of a cam member 88. The cam member 88 is operably attached for rotation with the actuating rod 46. When the actuating lever 50 is pivoted to either of positions A or B, a flattened portion or surface 90 on the cam 88 is moved respectively into alignment with either of surfaces 84 or 86 so as to permit either of the latching means 60, 62 to pivot inward about the fastener 72, 74. This pivotal movement shifts the pins 76 or 78 inward within the slotted openings 80, 82 and in the openings 52, 54 of members 42, 44. Movement of either of the pins 76, 78 will free one of the link arms 32, 34 from the restraints of the toothed portions 56, 58. Resultantly, the link arms 32, 34 may thereafter rotate about the axis of the tubular members 36, 38. Simultaneously, the outboard ends of members 32, 34 move upward and downward between positions shown in FIGS. 2, 4 and 5. When a desired selected height position of the seat cushion is attained, the lever 50 is returned to the position end which forces the latching means and pins 76, 78 to outboard positions with respect to the axis of rod 46. This reestablishes the interaction between pins 76, 78 and grooves 56, 58, thereby maintaining the position of link arms 32 and 34 in a preselected angular orientation.

Assisting the latching means 60, 62 to the inward position or unlatched position are small springs 92, 94. The mid coil portion of the springs encircle projections or bosses 96 and first end portions of the springs are restrained by projecting means 98. The other ends of the springs bear against surfaces 100 of the latching means 60, 62. The springs bias the latching means and pins 76, 78 toward the axis of the actuating rod 46 so that when the cam portions 88 is rotated so that its flat portion 90 is aligned with either of surfaces 84, 86, the pins are disengaged from the grooves or toothed portions 56, 58.

Although only one embodiment of the subject invention has been discussed and illustrated, other modifications in the invention may be adapted without falling outside the scope of the following claims which define the invention.

It is claimed:

1. A seat-adjusting mechanism for a vehicle seat cushion comprising: a seat cushion mounting member having forward and rearward end portions; a floor mounted support member having forwardly located and rearwardly located slotted apertures therein each having a generally vertical elongation; first and second link arms for the support of the seat cushion and extending respectively in a forward direction and a rearward direction, the forward end of said first arm being pivotally attached to said forward end portion of said seat cushion mounting member and the rearward end of said second arm being pivotally attached to the rearward end portion of said mounting member, the other end portion of said first and second arms being pivotally attached about a common axis to said support member midway between said slotted apertures; first and second latching members pivotally mounted respectively to said first and second link arms; pin means on said first and second latching members extending through said vertically extending slotted apertures and movable therein; toothed sectors formed upon the edges of said slotted apertures in said support member defining vertically stacked grooves to receive the pin means on said first and second latching members when pivoted forward and rearward respectively thereby, the forward and rearward orientation of said seat cushion being determined by the engagement of said pin means and one of the vertically stacked grooves in the support member; a latch release actuator located between said first and second latching members and operative to selectively and alternately permit said latching members to pivot to a position moving said pin means thereon out of one of the vertically stacked grooves for subsequent movement to another of the vertically stacked grooves.

2. A seat height-adjusting mechanism for a vehicle seat cushion, comprising: a seat cushion mounting member having forward and rearward end portions; a floor mounted support member having a generally vertical planar orientation and having forwardly located and rearwardly located slotted apertures therein, each slotted aperture having a generally vertical elongation; first and second link arms for the support of the seat cushion and extending respectively in a forward direction and in a rearward direction, the forward end of said first arm being pivotally attached to said forward end portion of said seat cushion mounting member and the rearward end of said second arm being pivotally attached to the rearward end portion of said mounting member, the other end portions of said first and second arms being pivotally attached about a common axis to said support member midway between said slotted apertures; first and second latching members pivotally mounted respectively to said first and second link arms; pins extending through said first and second latching members and with end portions extending through said vertically extending slotted apertures and being vertically movable therein as the forward and rearward edges of the seat cushion move up and down; toothed sectors formed upon the edges of said slotted apertures in said support member defining vertically stacked grooves to receive the pin ends on said first and second latching members when the members and pins are pivoted forward and rearward, respectively, the forward and rearward orientation of said seat cushion being determined by the engagement of said pin ends with one of the vertically stacked grooves in the support member; a latch member release actuator in the form of a rotatable cam located between said first and second latching members and operative to selectively and alternately permit said latching members to pivot to a position moving the pin ends out of one of the vertically stacked grooves thereby permitting generally vertical movement of the outboard ends of the link arms whereby a selected height of the seat cushion is thereafter re-established by movement of the latch release actuator to cause the pin end back into another of the vertically stacked grooves.

3. A seat adjusting mechanism for a vehicle seat comprising, a seat mounting member having forward and rearward end portions, a support member, a pair of arm members having adjacent ends thereof commonly pivotally mounted on the support member and extending oppositely of each other, means pivotally connecting the remote end of one arm member to the forward end portion of the mounting member, means pivotally connecting the remote end of the other arm member to the rearward portion of the mounting member, each arm member being independently swingable relative to the support member to vertically elevate the respective end portion of the mounting member and set the horizontal attitude of the mounting member relative to the support member, and adjustable means interconnecting an intermediate portion of each of said arm members and said support member for setting the pivotal location of each arm member relative to the support member, said adjustable means including latch means on one of said members and a respective group of vertically arranged latch engageable means on the other of said members, each latch means being engageable with a selected one of the latch engageable means of a respective group to set the pivotal location of a respective arm member, means holding each latch means in engagement with the selected one of the latch engageable means of a respective group, and means for releasing each latch means for engagement with another selected one of the latch engageable means of a respective group.

4. A seat adjusting mechanism for a vehicle seat comprising, a seat mounting member having forward and rearward end portions, a support member, a pair of arm members having adjacent ends thereof commonly pivotally mounted on the support member and extending oppositely of each other, means pivotally connecting the remote end of one arm member to the forward end portion of the mounting member, means pivotally connecting the remote end of the other arm member to the rearward portion of the mounting member, each arm member being independently swingable relative to the support member to vertically elevate the respective end portion of the mounting member and set the horizontal attitude of the mounting member relative to the support member, latch means pivotally mounted on each arm member intermediate the ends thereof, a group of vertically arranged latch engageable means on the support member respective to each latch means, the latch means being selectively engageable with a selected one of the latch engageable means of a respective group to set the pivotal position of a respective arm member with respect to the support member, means holding the latch means in engagement with the selected one of the latch engageable means of a respective group, and means for releasing each latch means for engagement with another selected one of the latch engageable means of a respective group.

5. A seat adjusting mechanism for a vehicle seat comprising, a seat mounting member having forward and rearward end portions, a support member, a pair of arm members having adjacent ends thereof commonly pivotally mounted on the support member and extending oppositely of each other, means pivotally connecting the remote end of one arm member to the forward end portion of the mounting member, means pivotally connecting the remote end of the other arm member to the rearward portion of the mounting member, each arm member being independently swingable relative to the support member to vertically elevate the respective end portion of the mounting member and set the horizontal attitude of the mounting member relative to the support member, torque means biasing the arm members to vertically elevate the mounting member to maximum position, latch means pivotally mounted on each arm member intermediate the ends thereof, a group of vertically arranged latch engageable means on the support member respective to each latch means, the latch means being selectively engageable with a selected one of the latch engageable means of a respective group to set the pivotal position of a respective arm member with respect to the support member, means holding the latch means in engagement with the selected one of the latch engageable means of a respective group, common means for selectively releasing each latch means for engagement with another selected one of the latch engageable means of a respective group, and cooperating means on the latch means and support member setting the vertically elevated maximum position of the mounting member.

6. A seat adjusting mechanism for a vehicle seat comprising, a seat mounting member having forward and rearward end portions, a support member, a pair of arm members having adjacent ends thereof commonly pivotally mounted on the support member and extending oppositely of each other, means pivotally connecting the remote end of one arm member to the forward end portion of the mounting member, means pivotally connecting the remote end of the other arm member to the rearward portion of the mounting member, each arm member being independently swingable relative to the support member to vertically elevate the respective end portion of the mounting member and set the horizontal attitude of the mounting member relative to the support member, means biasing the arm members to vertically elevate the mounting member to maximum position, latch means pivotally mounted on each arm member intermediate the ends thereof, a group of vertically arranged latch engageable means on the support member respective to each latch means, the latch means being selectively engageable with a selected one of the latch engageable means of a respective group to set the pivotal position of a respective arm member with respect to the support member, cam means commonly pivoted with the arm members and engageable with the latch means to hold the latch means in engagement with the selected one of the latch engageable means of a respective group, and means for rotating the cam means out of engagement with a selected latch means to permit the latch means to be selectively engaged with another selected one of the latch engageable means of a respective group.

* * * * *